(12) United States Patent
Reutter et al.

(10) Patent No.: US 6,988,943 B2
(45) Date of Patent: Jan. 24, 2006

(54) DEVICE AND METHOD FOR THE MANUFACTURE OF A STRAND OF A PASTY MASS AND EXTRUSION HEAD FOR SUCH A DEVICE AND METHOD, RESPECTIVELY

(75) Inventors: Sigfried Reutter, Eberhardzell (DE); Gerhard Schliesser, Wain (DE)

(73) Assignee: Albert Handtmann Maschinenfabrik GmbH & Co.KG, Biberach/Riss (DE)

( * ) Notice: Subject to any disclaimer, the term of this patent is extended or adjusted under 35 U.S.C. 154(b) by 0 days.

(21) Appl. No.: 10/458,138

(22) Filed: Jun. 9, 2003

(65) Prior Publication Data

US 2003/0228837 A1 Dec. 11, 2003

(30) Foreign Application Priority Data

Jun. 10, 2002 (EP) .................. 02012445

(51) Int. Cl.
*A22C 11/02* (2006.01)
(52) U.S. Cl. ...................................... 452/40
(58) Field of Classification Search .............. 452/21, 452/22, 27, 30–32, 35, 46, 51; 99/516, 534, 99/450.1, 450.6, 450.7, 486, 487, 494, 345, 99/32–38; 426/140, 108, 138, 274, 282, 426/285, 289, 291–293, 302
See application file for complete search history.

(56) References Cited

U.S. PATENT DOCUMENTS

| | | | |
|---|---|---|---|
| 3,767,821 A | 10/1973 | Deacon et al. | |
| 4,532,858 A * | 8/1985 | Hershfeld | ................. 99/534 |
| 5,056,425 A * | 10/1991 | Mally | ........................ 99/483 |
| 5,512,012 A * | 4/1996 | Lendle et al. | ................. 452/35 |
| 5,611,263 A | 3/1997 | Huang | |
| 5,759,602 A | 6/1998 | Kobussen et al. | |
| 5,843,504 A * | 12/1998 | Kobussen et al. | ......... 426/277 |
| 5,997,919 A * | 12/1999 | Kobussen et al. | ......... 426/105 |
| 6,024,637 A | 2/2000 | Scherch | |
| 6,283,846 B1 | 9/2001 | Townsend | |
| 6,585,580 B1 * | 7/2003 | Hergott et al. | ................ 452/32 |
| 6,733,812 B2 * | 5/2004 | Franklin et al. | ............ 426/513 |
| 2005/0034610 A1 | 2/2005 | Righele et al. | |

FOREIGN PATENT DOCUMENTS

| | | |
|---|---|---|
| DE | 9201169 A1 | 1/1994 |
| EP | 0755189 B1 | 7/2001 |
| EP | 9832340 B1 | 12/2001 |
| GB | 784235 | 10/1957 |
| GB | 1198498 | 7/1970 |
| WO | WO 93/12660 A1 | 7/1993 |
| WO | WO 99/22600 A1 | 5/1999 |
| WO | WO 02/15715 A1 | 2/2002 |
| WO | WO 03/024234 | 3/2003 |

* cited by examiner

*Primary Examiner*—Thomas Price
(74) *Attorney, Agent, or Firm*—Marshall, Gerstein & Borun LLP

(57) ABSTRACT

The invention relates to a device for the manufacture of a strand of a pasty mass, in particular sausage meat, with an extrusion head 2, comprising a device 27 for coextruding the pasty mass and a casing surrounding the pasty mass, a solidification device 3 for solidifying the casing, and a wring-off device 4. The invention is characterized in that a conveyor device 5 is arranged downstream of the wring-off device 4, the coextrusion device 27 and a strand guide 41 of the wring-off device 4 on the one hand and the conveyor device 5 on the other hand can be rotated relatively to one another.

11 Claims, 5 Drawing Sheets

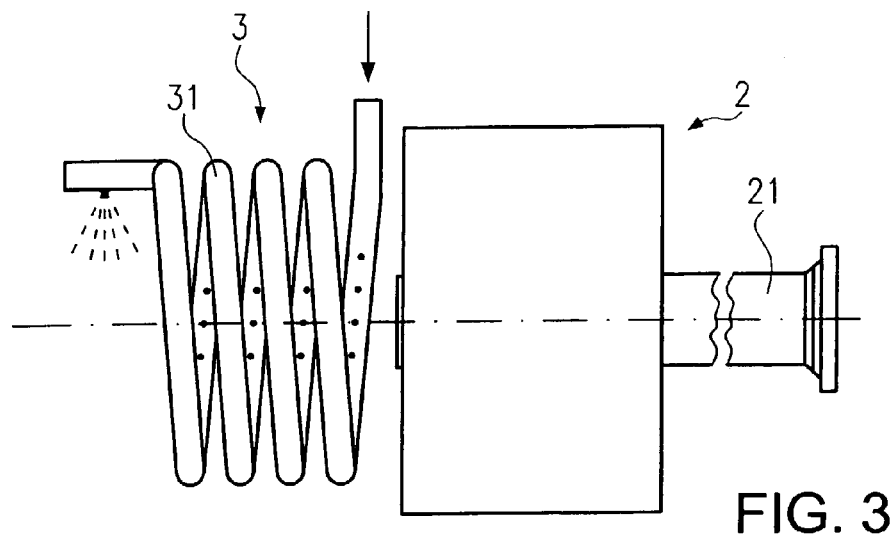
FIG. 3
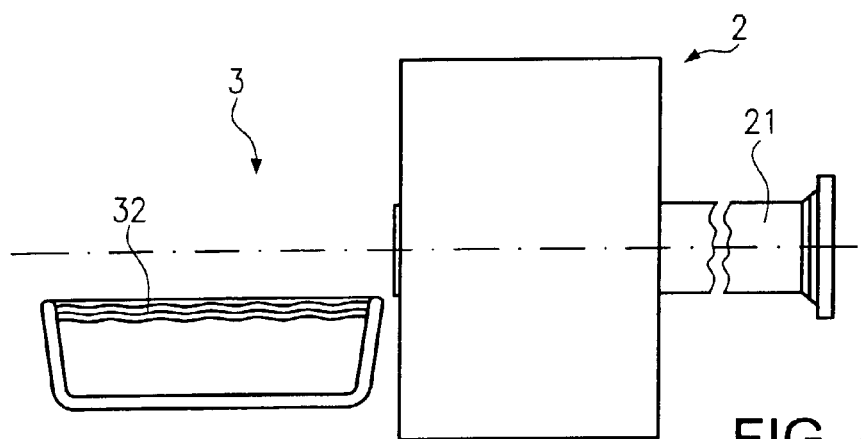
FIG. 4
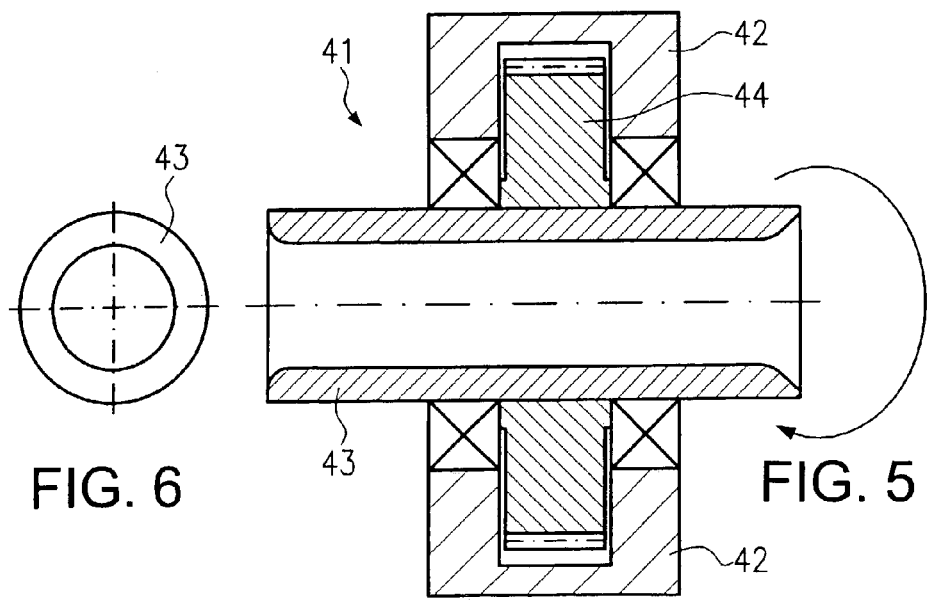
FIG. 6
FIG. 5

DEVICE AND METHOD FOR THE MANUFACTURE OF A STRAND OF A PASTY MASS AND EXTRUSION HEAD FOR SUCH A DEVICE AND METHOD, RESPECTIVELY

FIELD OF THE INVENTION

The invention relates to a device for the manufacture of a strand of a pasty mass, in particular sausage meat, with an extrusion head, comprising means for coextruding the pasty mass and a casing surrounding the pasty mass, a solidification means for solidifying the casing, and a wring-off means.

BACKGROUND OF THE INVENTION

A device of this kind is known from WO 93/12660.

The invention further relates to an extrusion head for coextruding a pasty mass, in particular sausage meat, and a casing surrounding the mass with a filling tube and an extrusion nozzle associated to the filling tube.

Such an extrusion head is known from WO 99/22600.

The device known from WO 93/12660 is in particular appropriate for the manufacture of continuous sausage strands. To this end, an extrusion head which is supplied with a pasty mass, in particular with sausage meat, from a reservoir, is provided. The extrusion head of this known device coextrudes the pasty mass with a casing surrounding the mass in an extruded form. The casing normally consists of collagen, i. e. of protein, which forms an aqueous gel having a high water content.

After the extruded product has exited from the extrusion head, the collagen skin has to be solidified by coagulation. For doing so, the collagen skin is exposed to a coagulation agent, for example a highly concentrated saline solution, for a relatively long period of time.

In the device known from WO 93/12660, the saline solution is contacted with the collagen skin in a solidification means. This solidification means directly joins the extrusion head and consists of a flute which spirally winds downwards starting from the extrusion head. The spiral shape of the solidification flute is to ensure a sufficiently long dwelling time of the extruded product in the flute.

Following this spiral flute, which can have a length of 10 to 15 m, a conventional separate wring-off unit is arranged, in which the extruded product is wrung off in portions. The extruded sausage wrung off in portions is subsequently taken out of the wring-off unit, suspended and conventionally smoked or otherwise further processed.

Due to the spiral design of the solidification flute and due to its considerable length, the production line has large dimensions and accordingly requires excessively space. Moreover, due to the relatively long dwelling time of the extruded product in the solidification flute, the output rate of the known device is relatively low.

The above mentioned disadvantages are partly overcome by the device described in EP 0 932 340 B1.

In this device, the solidification means comprises a belt conveyor instead of a solidification flute, on which the continuous extruded product rests and is drizzled with brine from nozzles along the conveying line. A separate wring-off unit can be provided following the conveying line, which unit takes over the extruded sausage with a sufficiently solidified skin and wrings it off.

It is true that by the use of this conveyor the output rate of this device can be increased. However, the belt conveyor of this solidification means as suggested in WO 93/12660 runs along a spiral path or in serpentines, respectively. Therefore, the device known from EP 0 932 340 B1 also requires a lot of space.

A similar device in which the extruded product is moved underneath spray nozzles on a serpentine-like conveyor with a flexible conveyor belt is known from U.S. Pat. No. 6,024,637. Another device for the manufacture of a strand of a pasty mass with a serpentine-like solidification means is known from EP 0 755 189 B1.

Altogether, in all above described conventional devices, a separate wring-off unit, which is disposed downstream of the spiral solidification line, wrings off the extruded sausage. Therefore, the installation of such devices requires a lot of space.

SUMMARY OF THE INVENTION

Starting from this prior art, it is an object of the invention to provide a device and a method for the manufacture of a coextruded strand of a pasty mass allowing a high output rate and at the same time having a compact construction providing the prerequisites for the wring-off procedure.

A further object underlying the invention is to provide an extrusion head to be used in such a device or such a method, respectively.

Due to the relative rotatability between the coextrusion means and the strand guide of the wring-off unit on the one hand and the conveyor means on the other hand, the prerequisite for wringing off a strand section located between the wring-off means and the conveyor means is provided.

This means that the conveyor means does not only serve for transporting the extruded product according to the invention, but that it also effects the twisting of the extruded product in cooperation with the strand guide of the wring-off means. In contrast, in the known devices, the conveyor means is a part of the solidification means and only serves for guiding the ejected sausage strand through the brine bath or the brine shower.

Furthermore, the conveyor means of the known devices has the function of elongating the hardening or drying distance which is effected by the spiral routing. The spiral routing of the solidification means prevents a coupling of the wring-off unit and a subsequent conveyor means not described in the prior art with the extrusion head.

According to the invention, the wring-off procedure is distributed to the conveyor means arranged downstream of the wring-off means as well as to the strand guide of the wring-off means and the coextrusion means of the extrusion head. Due to this distribution of the functions, one can advantageously dispense with a separate wring-off device in which the complete wring-off procedure is performed. The wringing off of the extruded product can rather be performed according to the invention by simple means, which enables a compact construction of the production line.

The invention is further characterized in that the conveyor means arranged downstream of the wring-off means effects, apart from the transport, a drawing off of the strand ejected from the extrusion head in synchronism with the ejection rate. This advantageously prevents a production pile-up at the extrusion head and the ejection rate can be increased.

In a preferred embodiment of the invention, for generating the relative revolution, the coextrusion means and the strand guide are rotatable, the conveyor means being adapted to stationarily feed the strand. The conveyor means thus draws off the strand and simultaneously holds it to prevent it from being twisted. Due to the revolution of the strand guide, the strand can be rotatingly entrained, such that the same is twisted with respect to the strand section stationarily held in the conveyor means. Due to the rotatable design of the coextrusion means, the strand section directly ejected from the extrusion head is made to follow the revolution of the strand guide. This prevents a twisting of the strand section located between the coextrusion means and the strand guide.

By this construction to be realized by simple means, the use of a separate wring-off unit can be dispensed with and the compactness of the plant can be improved.

In another preferred embodiment, the coextrusion means comprises a filling tube and an extrusion nozzle associated to the filling tube, the filling tube and the extrusion nozzle being rotatable about a longitudinal axis of the filling tube. By the rotation of the filling tube and the extrusion nozzle about the same longitudinal axis, the pasty mass and the casing surrounding this mass can be coextruded essentially without stresses.

In a preferred embodiment, the extrusion nozzle comprises an angular gap which is formed between the filling tube and a wall of the extrusion nozzle at the free end of the filling tube. Through this annular gap, the casing material is applied onto the pasty mass ejected from the filling tube in the form of a thin film for forming the sausage skin.

In a preferred manner, the annular gap essentially extends radially to the longitudinal axis of the filling tube, the wall essentially ending with the free end of the filling tube. An extrusion head with such an extrusion nozzle can be manufactured easily and inexpensively.

In another preferred embodiment, the annular gap essentially extends in parallel to the longitudinal axis of the filling tube, the wall essentially gripping over the free end of the filling tube. The wall can be furthermore mounted in the extrusion head to be axially shifted. This offers the advantage that the annular gap can be adjusted, i.e. that the distance between the wall and the end of the filling tube can be variably changed.

The wall can define a nozzle hollow space surrounding the filling tube and being connected to a mass supply. The casing material is introduced into the nozzle hollow space of the extrusion nozzle via the mass supply and from there it is sprayed onto the extruded sausage exiting from the filling tube through the annular gap. The nozzle hollow space can advantageously compensate pressure variations in the supply of the casing material which improves the uniformity of the applied film.

The extrusion nozzle is preferably fixedly connected to the filling tube and rotatably mounted. This permits a very compact design of the extrusion head. At the same time, a synchronous revolution of the extrusion nozzle and the filling tube is achieved thereby.

The strand guide of the wring-off means can comprise a sleeve rotatably mounted in a housing and connected to a gearwheel. The extruded sausage is guided through this sleeve and rotatingly entrained with a revolution of the strand guide. The revolution can be generated by the gearwheel which can be coupled to a drive.

In a preferred manner, the wring-off means and the coextrusion means are synchronously driven, such that stresses in the strand section between the wring-off unit and the coextrusion means are avoided due to the synchronous revolution.

The conveyor means can comprise at least two parallel conveying belts the caliber of which can be adjusted and which stationarily feed a strand section located between them. Due to the adjustability of the parallel conveying belts, the device can advantageously be adapted to extruded sausages having different calibers. Furthermore, with this embodiment, the conveying function as well as the holding function of the conveyor means are realized in a simple manner.

The extrusion head, the solidification means, the wring-off means and the conveyor means can be aligned resulting in an especially compact design.

The solidification means can comprise an annular shower or a tub for brine which are arranged directly behind the extrusion head. This solidification means does not have to have a spiral design, as in the prior art, in order to ensure a sufficiently long dwelling time for the extruded sausage.

This long dwelling time hitherto necessary for achieving an adequate stability of the sausage casing has been necessary in the past due to the collagen materials used. However, in the meantime, materials for manufacturing a sausage casing film which only require a very short hardening time of approx. 1 second are available on the market. This, for example, includes a material referred to as Rudin CoEx Vegacasing. Furthermore, vegetable materials, for example made of algae, can be processed as in the WO 02/15715.

Due to the extremely short hardening time of these casing materials it is not necessary to elaborately form the solidification means in a spiral shape. A straight-lined annular shower or a tub is rather sufficient for contacting the sausage skin with the brine during a relatively short time.

In another preferred embodiment, a displacement unit is provided between the wring-off means and the conveyor means. This displacement unit displaces the pasty mass at determined spots of the extruded product, such that at these spots the sausage strand can be easily wrung off.

The displacement unit advantageously comprises two displacers which operate in opposite directions and synchronously and which form a gap in a closed condition. When the extruded sausage passes through the displacement unit, the displacers are closed and form a gap from which the pasty mass is forced out. Then, essentially only the sausage skin remains in the gap.

In the following, the invention will be illustrated more in detail by means of embodiments and with reference to the enclosed schematic drawings, wherein:

BRIEF DESCRIPTION OF THE DRAWINGS

FIG. 3 shows a side view of a cutout of the device of FIG. 1, comprising an annular shower and the extrusion head;

FIG. 4 shows a side view of a further embodiment of the invention, comprising a tub for brine and the extrusion head;

FIG. 5 shows a cross-section of a wring-off means;

FIG. 6 shows a cross-section of the strand guide of the wring-off means of FIG. 5.

DETAILED DESCRIPTION OF THE INVENTION

Figure 1:
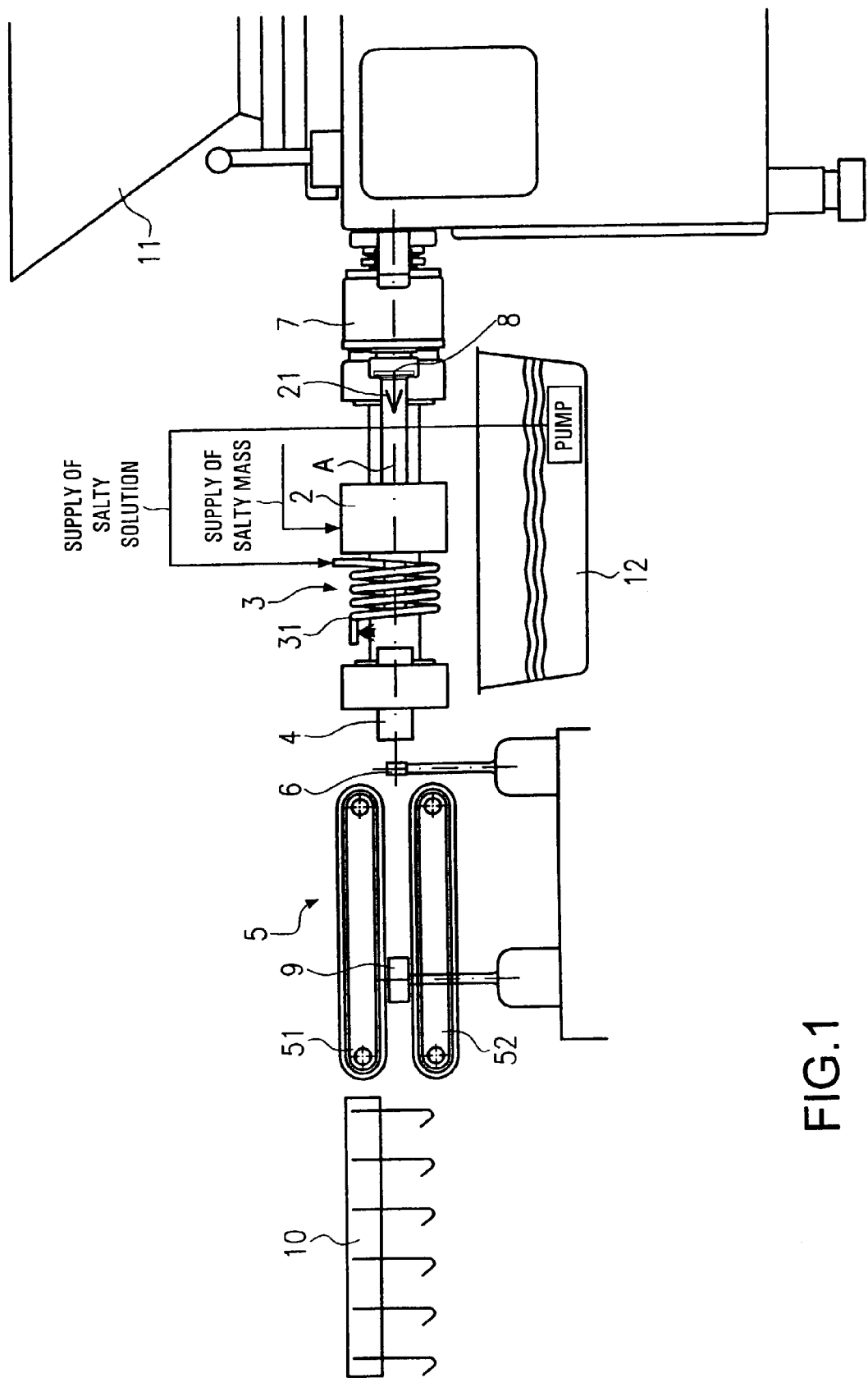
FIG. 1 shows a side view of an embodiment of the invention.

As shown in FIG. 1, the device comprises a reservoir 11 via which a pasty mass, for example sausage meat, can be fed to the filling tube 21. The sausage meat is introduced under pressure into the filling tube 21 through an opening 8, which is also shown in cross-section in FIG. 2a, and fed to the extrusion head 2. The extrusion head 2 is connected to a supply 26 for an outer mass, i.e. for the casing material.

For the coextrusion, sausage meat is fed as inner mass to the extrusion head 2 through the filling tube 21 in direction of arrow B, and at the same time casing material is fed to the extrusion head 2 through the supply 26 in direction of arrow C. This is in particular shown in FIG. 2.

As can be further seen in FIG. 1, the coextruded sausage strand exiting from the extrusion head 2 is passed through an annular shower 31, which is part of the solidification means 3 and provided downstream of the extrusion head 2. The annular shower 31 is connected with a supply for brine which is fed to the annular shower 31 by means of a pump from another reservoir 12. After the extruded sausage has exited from the solidification means 3, the sausage skin is hardened and comprises an adequate stability for not being torn when the extruded sausage is wrung off in portions.

In the conveying direction after the solidification means 3, the wring-off means 4, the displacement unit 6 and the conveyor means 5 are successively arranged.

In the embodiment shown in FIG. 1, the strand guide 41 of the wring-off unit 4 and the coextrusion means 27 comprising the filling tube 21 and the extrusion nozzle 22 are rotatably arranged. The strand guide 41 is represented in detail in FIG. 5 and the coextrusion means 27 in FIG. 2*a* and they are described below more in detail.

The coextrusion means 27 and the filling tube 21 are driven via a drive unit 7, which is arranged in the conveying direction in front of the supply opening 8 of the filling tube 21.

As can be further seen in FIG. 1, the conveyor means 5 is designed as two parallel conveying belts 51, 52. The distance between these two conveying belts 51, 52 can be varied in order to be able to adapt the conveyor means 5 to sausage strands of different calibers.

In operation, a sausage strand is passed through the wring-off means 4 and between the conveying belts 51 and 52 after it has exited from the solidification means 3. The conveying belts 51, 52 draw off the sausage strand ejected from the extrusion nozzle 22 in synchronism with the ejection rate and simultaneously transport the finished product to the suspension means 10.

The two conveying belts 51, 52 further have the function of holding the strand section located between these conveying belts 51, 52 during the drawing off to prevent its twisting. This is done by adjusting a predetermined distance between the conveying belts 51, 52, such that the conveying belts 51, 52 exert a certain pressure on the strand section located therebetween which is high enough for securing the strand section against twisting, however without damaging it.

For wringing off the sausage strand, the wring-off means 4 applies a torque to the strand section located between the conveyor means 5 and the wring-off means 4. For doing so, the strand guide 41 shown in FIG. 5 is rotated by a desired number of revolutions, the strand section located in the strand guide 41 being rotated along. As the strand section located in the conveyor means 5 is held against twisting, by the rotation of the strand guide 41 of the wring-off unit 4, the strand section located between wring-off unit 4 and conveyor means 5 is twisted. This makes it possible to wring off the sausage strand in portions.

In order to prevent the strand section located between the wring-off means 4 and the extrusion head 2 from being twisted during the wringing off, the coextrusion means 27, that means the filling tube 21 and the extrusion nozzle 22 associated to the filling tube 21, are rotatably mounted.

In this manner, the complete strand section can be rotated starting from the extrusion nozzle 22 down to the conveyor means 5, the introduction of the torque being effected in the wring-off means 4. This means that the strand section between the extrusion nozzle 22 and the wring-off unit 4 essentially remains free from torsions, while the strand section between the wring-off means 4 and the conveyor means 5 is twisted.

For achieving a completely torsion-free condition of the sausage strand between the wring-off unit 4 and the extrusion head 2, the wring-off means 4 and the extrusion head 2 are coupled in synchronism with the drive unit 7.

The above described relative revolution between the conveyor means and the wring-off means can be alternatively achieved in that the wring-off means and the extrusion head are stationary, i.e. that they do not permit any revolution of the sausage strand. The revolution necessary for the wringing off is then imparted to the sausage strand via a correspondingly adapted conveyor means. This adapted conveyor means permits the simultaneous axial transport of the sausage strand and the rotation of the sausage strand about an axis in the conveying direction.

In the following, the individual subassemblies of the device shown in FIG. 1 are described in more detail.

Figure 2A:
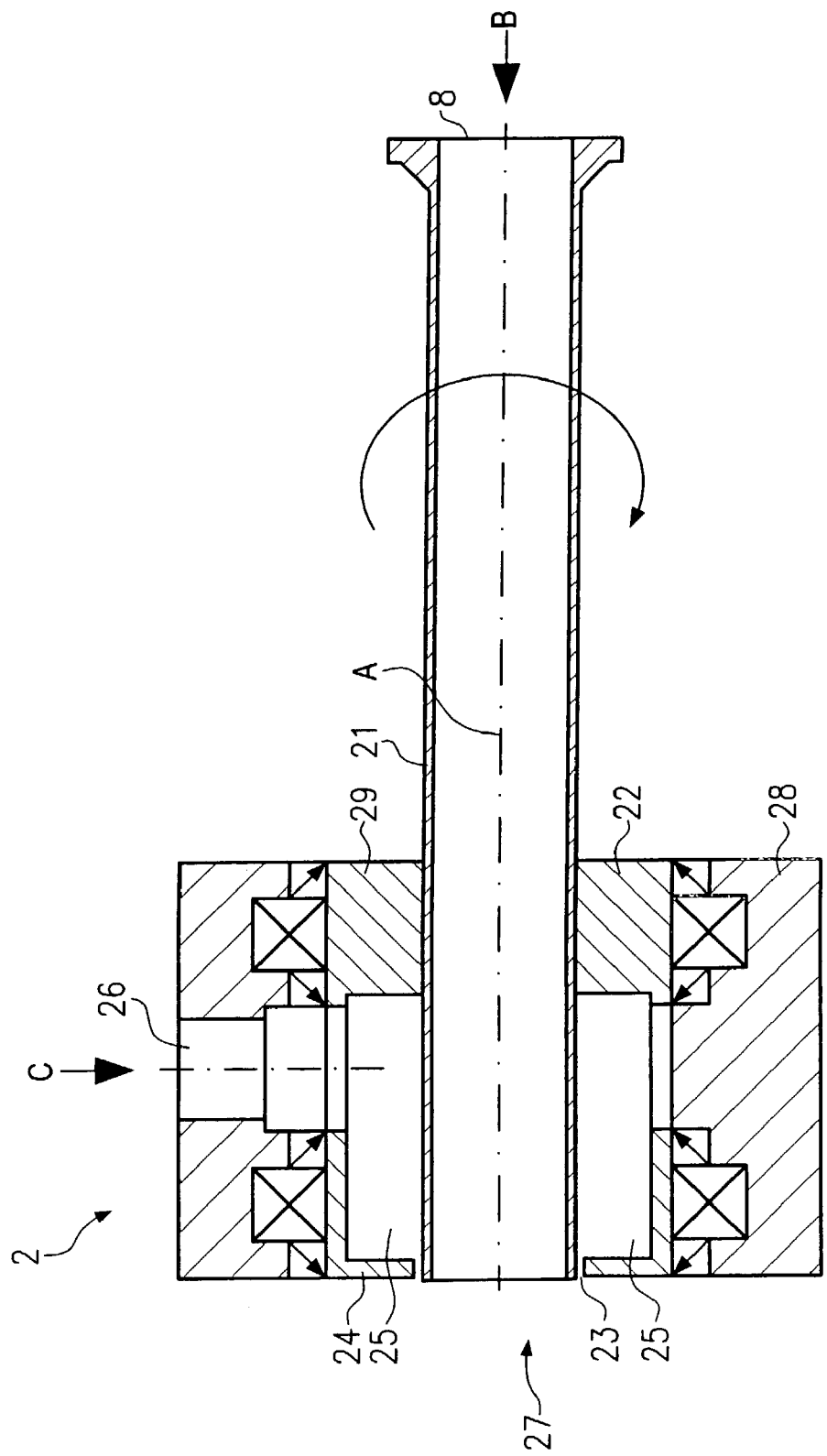
FIG. 2a shows a cross-section of the extrusion head of the device of FIG. 1.

The extrusion head 2 shown in FIG. 2*a* comprises the filling tube 21 and the extrusion nozzle 22. The filling tube 21 and the extrusion nozzle 22 can be rotated about the longitudinal axis A of the filling tube 21, as indicated by the arrow of rotation. The extrusion nozzle 22 is fixedly connected to the filling tube 21, for example by a press fit. Other types of connection are, of course, also possible. The extrusion nozzle 22 is rotatably mounted in a housing 28 and sealed against the surrounding area in order to prevent impurities from penetrating the sausage strand.

The extrusion nozzle 22 comprises an annular gap 23 which concentrically surrounds the filling tube 21. This annular gap 23 is formed between a wall 24 of the extrusion nozzle 22 at the free end of the filling tube 21 as well as at the filling tube 21.

Here, the annular gap 23 essentially extends radially to the longitudinal axis A of the filling tube 21, the wall 24 essentially ending with the free end of the filling tube 21, as can be recognized in FIG. 2*a*.

Figure 2B:
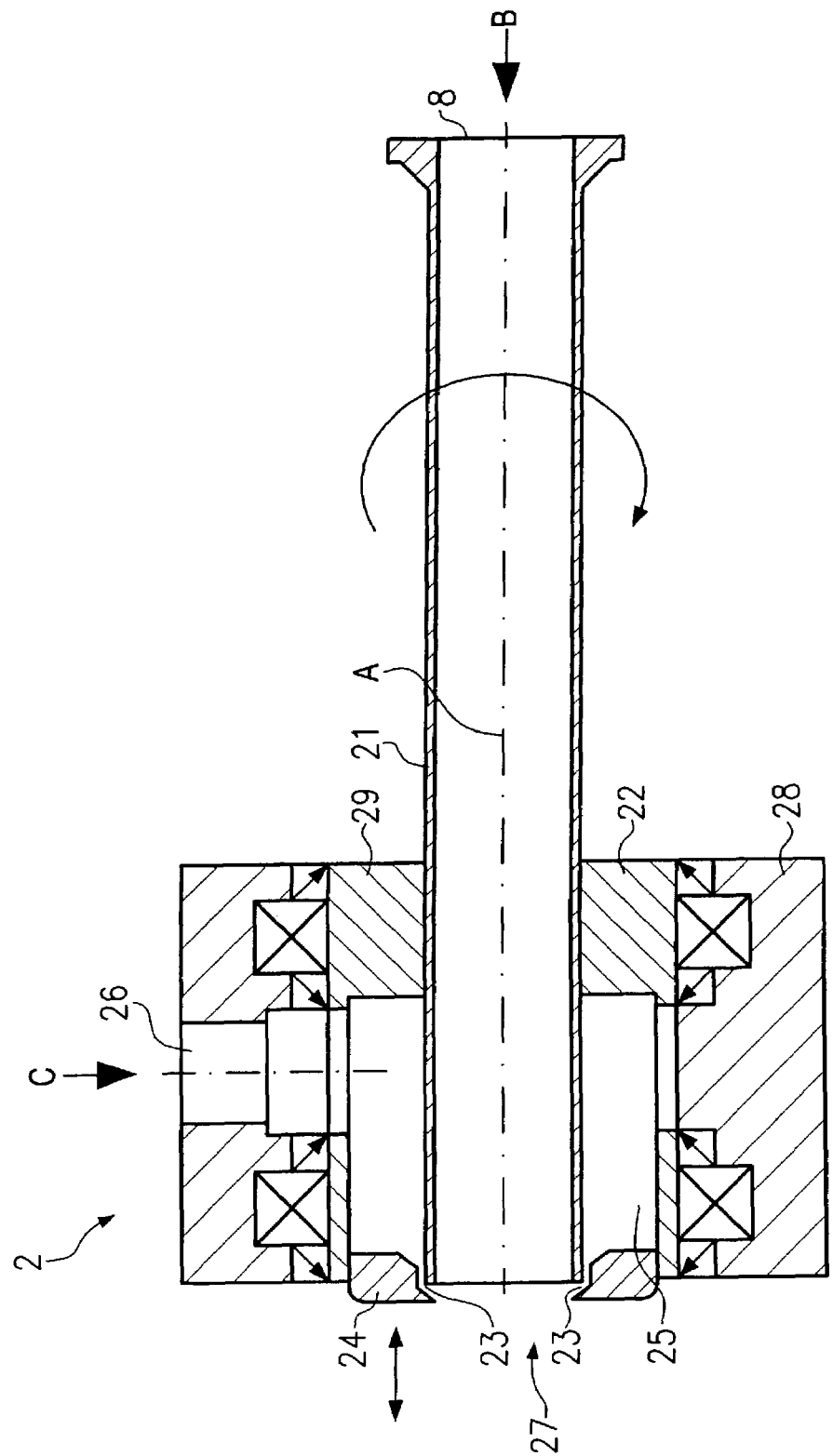
FIG. 2b shows a cross-section with a modified annular gap arrangement.

As an alternative, it is also possible, as shown in FIG. 2*b*, to form the wall 24 as an annular disk which grips over the free end of the filling tube 21 at its internal circumference. The annular gap 23 thus formed between the overgripping area of the wall 24 and the free end of the filling tube 21 extends, as shown in FIG. 2*b*, in parallel to the longitudinal axis A of the filling tube.

The annular disk, i.e. the wall 24, is inserted in the axial direction in the extrusion head 2 and can be shifted by sliding. By axially shifting the annular disk in the direction of the double arrow in FIG. 2*b*, the annular gap which also extends in the axial direction, i.e. the distance between the overgripping area of the annular disk and the free end of the filling tube 21, can be varied.

The wall 24 defines a nozzle hollow space 25 which is in communication with the supply 26 for the casing material. The hollow space 25 is defined by another wall 29 which has a greater thickness than the wall 24. The filling tube 21 and the extrusion nozzle 22 are connected to one another in the area of the thicker wall 29. The wall 29 has such dimensions that the connection between the extrusion nozzle 22 and the filling tube 21 has an adequate strength.

In operation, pasty casing material is pressed into the nozzle hollow space 25 in direction of arrow C via the supply 26 and from there it is pressed out from the extrusion nozzle 22 through the annular gap 23. Simultaneously, pasty mass, for example sausage meat, is brought through the filling tube 21 in direction of arrow B to the free, in FIG. 2a left, end of the filling tube 21. For the coextrusion, the casing material is sprayed through the annular gap 23 of the extrusion nozzle 22 onto the sausage meat exiting at the free end of the filling tube 21.

The thickness of the applied sausage skin can be adjusted by changing the size of the annular gap 23. The quantitative proportion of the casing material to the sausage meat can be controlled via the feed speeds of the feed pumps associated to the extrusion nozzle 22 and the filling tube 21, respectively.

When the sausage strand is wrung off between the wring-off means 4 and the conveyor means 5, the filling tube 21 and the extrusion nozzle 22 fixedly connected thereto are rotated about axis A of the filling tube by means of the drive 7. This means that the casing material as well as the sausage meat are rotated in synchronism during the wringing off, such that the casing material can be uniformly sprayed onto the sausage meat.

The solidification means 3 provided downstream of the extrusion head 2 is provided with the annular shower 31 as shown in FIG. 3. The annular shower 31 is connected to a reservoir via a pump for the supply of brine. Alternatively, a brine bath in a tub 32 through which the extruded product strand is passed can be arranged after the extrusion head 2.

Due to the very short hardening times of the available casing materials, the solidification line can be kept short, as shown in FIG. 1.

The wring-off means is arranged directly after the annular brine shower 31 or the brine bath 32. The wring-off means 4 comprises the strand guide 41 with a sleeve 43 rotatably mounted in a housing 42.

The sleeve 43 is rounded at its ends, the rounding being flatter at the front inlet opening in the conveying direction than at the rear outlet opening. As the inside diameter of the sleeve 43 is somewhat smaller than the outside diameter of the sausage strand in order to generate a certain friction or positive locking, respectively, the flattening of the sleeve 43 at the inlet side prevents the sausage strand from being damaged when it enters the sleeve 43.

The sleeve is driven via a drive wheel 44, for example a frictional wheel or a gearwheel, which is fixedly connected to the sleeve 43. The drive wheel 44 can be coupled to the drive 7.

In operation, the sausage strand is passed through the sleeve 43 and rotatably entrained by the revolution of the sleeve 43 when it is wrung off. By the cooperation of the rotatable filling tube 21, the extrusion nozzle 22 fixedly connected thereto and the rotatable sleeve 43, a twisting of the sausage strand stationarily held in the conveyor means is enabled.

Figure 7A:
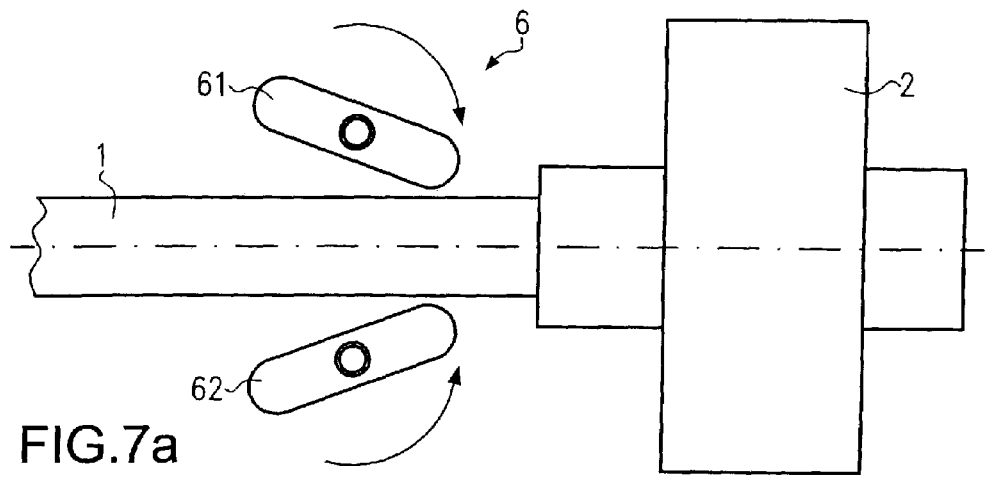
FIGS. 7A–7C show side views of the displacement unit in various positions.
Figure 7B:
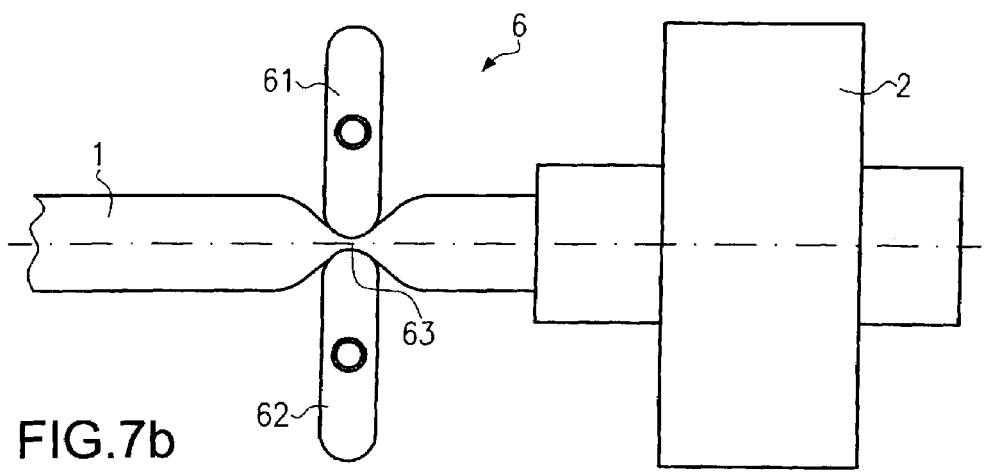
Figure 7C:
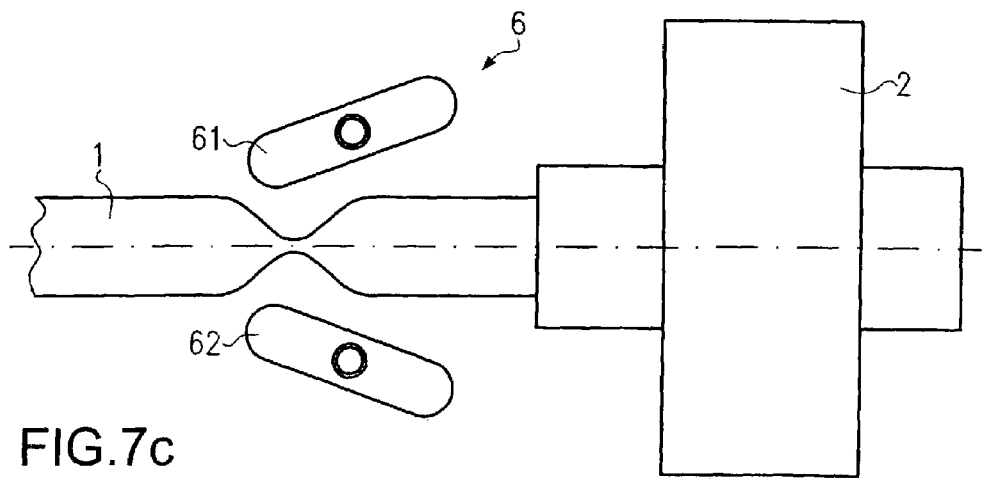

The displacement unit 6 provided in FIG. 1 between the wring-off means 4 and the conveyor means 5 is shown in more detail in FIGS. 7A, 7B and 7C.

The displacement unit 6 serves for displacing the pasty inner mass at the desired division spots along the longitudinal axis of the extruded product. For doing so, the displacement unit 6 comprises two rotatably mounted displacers 61, 62 which operate in opposite directions and synchronously. When the displacers 61, 62 are closed or engaged, as shown in FIG. 7B, the inner mass is displaced with respect to the solidified outer mass, i.e. the sausage skin. This results in a gap in the extruded product. In order to avoid a shearing off of the extruded product or of the solidified casing, there is a gap 63 between the closed displacers 61, 63, as can be seen in FIG. 7B. The size of this gap 63 depends on the thickness of the outer skin.

After the extruded product has been subdivided by the movement of the displacers 61, 62, the wrung off strand which is torsionally prestressed can thus release the tension by a necking, i.e. the desired wring-off spot, entering the displaced gap.

The strand of the portions is variable and is determined by driving the non-depicted drive of the displacement unit 6. The number of the wringing offs is also variable and is determined by driving the drive 7 of the wring-off means 4.

Alternatively, one can dispense with the displacement unit 6, such that the conveying belts 51, 52 are arranged directly downstream of the wring-off means 4.

The gap in the interior of the sausage strand necessary for the wringing off can, in this embodiment, be achieved by slowing down the extrusion filling flow or only by lowering the conveying capacity of the inner mass with a constant conveying capacity of the outer mass and a simultaneous acceleration of the conveying belts 51, 52.

Like in the variant with the displacement unit 6, in operation, the strand is torsionally prestressed by the rotation of the wring-off means 4 with respect to the conveying belts 51, 52. The wring-off spot of the prestressed sausage strand enters the resulting gap and forms a portion.

The device shown in FIG. 1 can naturally be combined with additional components, such as a cutting means 9 or the suspension means 10.

The filling tube 21 with extrusion nozzle as well as the sleeve 43 are format parts which are used for generating different sausage calibers.

What is claimed is:

1. Device for the manufacture of a strand (1) of a pasty mass, in particular sausage meat, with a casing surrounding the pasty mass, comprising an extrusion head (2), coextrusion means (27) for coextruding the pasty mass, a solidification means (3) for solidifying the casing, a wring-off means (4), a conveyor means (5) arranged downstream of the wring-off means (4), the coextrusion means (27) and a strand guide (41) of the wring-off means (4) being rotatable relative to the conveyor means, wherein either the coextrusion means (27) and the strand guide (41) can be rotated, and the conveyor means (5) is adapted to stationarily feed the strand (1), or the conveyor means (5) is adapted to rotate the sausage strand while the strand guide (41) and the coextrusion means (27) are stationary.

2. Device according to claim 1, wherein the coextrusion means (27) comprises a filling tube (21) and an extrusion nozzle (22) associated to the filling tube (21), the filling tube (21) and the extrusion nozzle (22) being rotatable about a longitudinal axis (A) of the filling tube (21).

3. Device according to claim 2, wherein the extrusion nozzle (22) comprises an annular gap (23) which is formed between the filling tube (21) and a wall (24) of the extrusion nozzle (22) at the free end of the filling tube (21).

4. Device according to claim 3, wherein the annular gap (23) extends substantially radially to the longitudinal axis (A) of the filling tube (21), and the wall (24) ends substantially with the free end of the filling tube (21).

5. Device according to claim 3, wherein the annular gap (23) extends substantially in parallel to the longitudinal axis (A) of the filling tube (21), and the wall (24) overgrips the free end of the filling tube (21).

6. Device according to claim 5, wherein for adjusting the annular gap (23), the wall (24) is mounted in the extrusion head (2) to be axially shifted.

7. Device according to claim 3, wherein the wall (24) defines a nozzle hollow space (25) surrounding the filling tube (21), and the hollow space 25 (25) is connected to a mass supply (26).

8. Device according to claim 2, wherein the extrusion nozzle (22) is fixedly connected with the filling tube (21) and is rotatably mounted.

9. Device according to claim 1, wherein the strand guide (41) comprises a sleeve (43) rotatably mounted in a housing (42), the sleeve (43) being connected to a drive wheel (44).

10. Device according to claim 1, wherein the wring-off means (4) and the coextrusion means (27) are synchronously driven.

11. Device according to claim 1, wherein the conveyor means (5) comprises at least two parallel conveying belts (51, 52) the calibers of which can be adjusted and which stationarily transport a strand section located therebetween.

* * * * *

UNITED STATES PATENT AND TRADEMARK OFFICE
CERTIFICATE OF CORRECTION

PATENT NO. : 6,988,943 B2
APPLICATION NO. : 10/458138
DATED : January 24, 2006
INVENTOR(S) : Siegfried Reutter et al.

It is certified that error appears in the above-identified patent and that said Letters Patent is hereby corrected as shown below:

On Title Page, Item -75- "Sigfried Reutter" should be --Siegfried Reutter--.

Signed and Sealed this

Seventeenth Day of April, 2007

JON W. DUDAS
*Director of the United States Patent and Trademark Office*